United States Patent [19]

Ichikawa

[11] Patent Number: 5,132,956
[45] Date of Patent: Jul. 21, 1992

[54] OPTICAL RECORDING/REPRODUCING APPARATUS IN WHICH DEFECTIVE SECTORS ARE ALTERED

[75] Inventor: Hitoshi Ichikawa, Machida, Japan

[73] Assignee: Olympus Optical Co., Ltd., Tokyo, Japan

[21] Appl. No.: 481,016

[22] Filed: Feb. 16, 1990

[30] Foreign Application Priority Data

Feb. 16, 1989 [JP] Japan .................. 1-36990

[51] Int. Cl.⁵ .............................. G11B 7/00
[52] U.S. Cl. ............................ 369/54; 369/58; 369/59; 369/32; 360/53; 360/31
[58] Field of Search ............ 369/54, 53, 58, 59, 369/32, 44.26, 124; 360/45, 53, 72.2, 40, 48, 31

[56] References Cited

U.S. PATENT DOCUMENTS

| | | | |
|---|---|---|---|
| 4,638,472 | 1/1987 | Ogata et al. | 369/54 |
| 4,769,804 | 9/1988 | Satoh et al. | 360/60 |
| 4,774,700 | 9/1988 | Satoh et al. | 369/54 |
| 4,814,903 | 3/1989 | Kulakowski et al. | 369/59 |
| 4,821,254 | 4/1989 | Satoh et al. | 369/58 |
| 4,833,663 | 5/1989 | Satoh et al. | 369/59 |
| 4,949,326 | 8/1990 | Takagi et al. | 369/54 |

FOREIGN PATENT DOCUMENTS 60-205741  10/1985  Japan .

*Primary Examiner*—Roy N. Envall, Jr.
*Assistant Examiner*—Thang V. Tran
*Attorney, Agent, or Firm*—Armstrong & Kubovcik

[57] ABSTRACT

An optical recording/reproducing apparatus arranged to perform verification processing on whether or not information has been correctly recorded in a target sector of an optical recording medium by reproducing the information. If the target sector is determined to be defective, linkage information about the correspondence between the target sector and an alternative sector is stored/recorded and the verify processing is continued until a non-defective alternative sector is detected. Thus, only linkage information about the correspondence between the non-defective sector and the target sector is registered and linkage information about the corespondence between the defective alternative sector and the target sector is erased.

17 Claims, 6 Drawing Sheets

CONTENT OF MAP

| DEF. SECTOR | ALT. SECTOR |
|---|---|
| 00 00 00 01 | 00 00 01 00 |
| 00 00 00 00 (FF FF FF FF) | 00 00 00 01 (FF FF FF FF) |
| 00 00 00 00 (FF FF FF FF) | 00 00 00 02 (FF FF FF FF) |

FIG. 4b

CONT. OF MAP

| DEF. SEC. | ALT. SEC. |
|---|---|
| FF FF FF 01 | 00 00 01 00 |
| 00 00 00 01 | 00 00 01 01 |
| 00 00 00 00 (FF FF FF FF) | 00 00 00 02 (FF FF FF FF) |

FIG. 4c

CONT. OF MAP

| DEF. SEC. | ALT. SEC. | |
|---|---|---|
| FF FF FF 01 | 00 00 01 00 | ⎫ |
| FF FF FF 01 | 00 00 01 01 | ⎬ DEF. SECTOR |
| FF FF FF 01 | 00 00 01 02 | ⎭ |
| 00 00 00 01 | 00 00 01 03 | ⎫ NON-DEF. SECTOR |
| 00 00 00 03 | 00 00 01 04 | ⎭ |

OPTICAL RECORDING/REPRODUCING APPARATUS IN WHICH DEFECTIVE SECTORS ARE ALTERED

BACKGROUND OF THE INVENTION

1. Field of the Invention

The present invention relates to an optical recording/reproducing apparatus of a type in which an alternative section can be readily accessed instead of a defective section.

A hard disk has been known as a recording/reproducing apparatus used with a magnetic head and capable of recording a relatively large amount of data.

Recently, an optical recording/reproducing apparatus, using an optical head as an alternative to a magnetic head and thereby capable of recording significantly more data than that recorded by a hard disc apparatus, has been put into practical use.

In the above-described optical recording/reproducing apparatus, a disc-like optical recording medium (to be called "an optical disk" hereinafter) is widely used.

If data written on the optical disk of the type described above cannot be correctly reproduced even though error correction processing has been conducted, alternative processing for rewriting the data in a different section (called "an alternative section") is performed.

That is, when the operation of writing in one sector of a plurality of sectors of each of the tracks of an optical disk has been performed with the purpose of recording data, an operation for verifying the data is conducted at the time the optical head scans the sector after the optical disk has rotated once for the purpose of confirming that the writing operation has been conducted correctly. If there are errors in the data after the data obtained from the above-described reading operation has been modulated, the errors are corrected by an error correction function. However, if the numbers of errors exceeds the correcting capacity or if an index portion, in which the address information of the sector in which data has been recorded is recorded, cannot be detected (identified), the controller determines that the sector is a defective sector and writes the same data in an alternative sector. The alternative sector may be positioned in the same track as that for the defective sector or on another track. In alternative processing of this type, the physical address of the defective sector and of the alternative sector are registered in a map (an SDL) in memory so as to be subjected to a reference in the next writing and reading operation. Technology of this type has been disclosed in Japanese Patent Laid-Open No. 60-205741.

According to the present invention, there is provided a hard disk apparatus comprising a usual convention sector and an alternative sector which is used instead of a defective user sector, whereby the defective sector can be replaced.

In the above-described alternation processing in which the map (the SDL) is used, if the alternative sector used instead of the defective sector also involves defects, the alternative sector must be alternated again. In this case, the map includes combinations of addresses of a plurality of the defective sectors and the addresses of alternative sectors. Therefore, in order to prevent the defective sector from being accessed for writing or reading, the sector which has been finally alternated must be accessed for writing or reading after all of the combinations of the defective sectors and the alternative sectors have been read out from the map so as to find the final alternative sector.

According to the above-described Japanese Patent Laid-Open No. 60-205741, the following operation is performed if the alternative sector is defective:

Assuming that sector (0.1)[0: track No., 1: sector No.] is the defective sector as shown in FIG. 1A, its alternative sector (1.0) is accessed for alternation. If the alternative sector (1.0) is defective, its alternative sector is further accessed for the alternation. Referring to FIG. 1A, the sector which has finally succeeded in the alternation is alternative sector (1.3). As a result, the contents of a map in the memory becomes as shown in FIG. 1B. The forward 2 bits in the alternative sector indicative region serve as a flag, where [11] represents a fact that the alternative sector is defective while [01] represents a fact that its alternative sector has been succeeded in the alternative processing. Therefore, (1), (2) and (3) represent the fact that the alternative sector is defective, while (4) represents the sector which has been succeed in the alternative processing.

Then, when sector (0.1) is read referring to FIG. 1A, the controller examines the flag so as to determine whether or not the alternative sector corresponding to the defective sector can be used since sector (0.1) is a defective sector. Referring to FIG. 1B, since the thus specified alternative sector is also defective, the controller must again examine the map so as to read whether or not the further alternative sector can be used. As described above, in the case where the alternative sectors are successively defective, the flags of all of the corresponding alternative sectors must be read.

The above-described method renders the transfer rate to be lowered and the alternative processing to become too complicated as an external storage apparatus since the correspondence of the defective sectors and all of the corresponding alternative sectors must be examined.

Furthermore, the method of the above-described conventional examples cannot be applied to the case where the recording medium is replaced.

SUMMARY OF THE INVENTION

An object of the present invention is to provide an optical recording/reproducing apparatus of a type in which, even if defective sectors are present, their alternative sectors can be accessed in a significantly short time and thereby deterioration in the transfer rate can be prevented.

Another object of the present invention is to provide an optical recording/reproducing apparatus of a type in which the operations for controlling defective sectors can be simplified.

According to the present invention, there is provided an optical recording/reproducing apparatus comprising:

an optical head having beam generating device for generating convergeable beams, an optical system for applying the beams to an optical recording medium and a photo-detector for receiving the beams returned from the optical recording medium;

record signal output device for transmitting a record signal corresponding to record information to be recorded in the beam generating device;

reproduction information generating device for generating reproduction information corresponding to information recorded in the optical recording medium from a reproduction signal transmitted from the photo-detector;

first defect-determining device for making a comparison, by a comparison device thereof, between reproduction information obtained by reproducing, by using the reproduction information generating device, information temporarily recorded in a target recording area in the optical recording medium by using the record signal generating device and information which has not been recorded yet so as to determine whether or not the two sets of information coincide with each other within the error correction capacity, so that it is determined that the target recording area is a recording area which is not defective;

second defect-determining device arranged to act when the target recording area has been determined to be a recording area which is defective by the first defect-determining device, the second defect-determining mean storing/recording linkage information about the correspondence between an alternative recording area which is used instead of the target recording area and the target recording area in a linkage information storage/recording device, temporarily recording information, to be recorded in the target recording area, in the alternative recording area, and reproducing the information so as to determine whether or not the alternative recording area is an alternative recording area which is not defective; and linkage information processing device arranged to act when it has been determined by the second defect-determining device, that the alternative recording area is an alternative recording area which is defective, the linkage information processing device successively determining whether or not the alternative recording areas are defective until the second defect-determining device determines an alternative recording area to be non-defective, substantially erasing the linkage information about the correspondence between the alternative recording area which has been determined to be defective and the target recording area, and causing only linkage information about the correspondence between the alternative recording area which has been determined to be non-defective and the target recording area to be stored/recorded. As a result, the defective target recording are and the non-defective alternative recording area are directly linked to each other. Therefore, even if a defective alternative recording area is present, it cannot be accessed so that record information can be reproduced in a short time.

Other and further objects, features and advantages of the invention will be appear more fully from the following description.

BRIEF DESCRIPTION OF THE DRAWINGS

FIGS. 2 to 7 relate to a first embodiment of the present invention, where

FIG. 2 is a flow chart which illustrates processing in a recording mode according to the first embodiment;

FIG. 3 is a structural view which illustrates the overall body of an optical recording/reproducing apparatus according to the first embodiment;

FIGS. 4a-4c illustrate the contents of linkage information representing the correspondence between target recording area which has been determined to be defective and the addresses of their alternative sectors, the correspondence being stored in a temporary map;

FIG. 5 illustrates a defect control area formed in a portion of an optical disk;

FIG. 7 illustrates a state in which, if the sector is defective, alternative sectors are successively assigned until an alternative sector is detected;

DESCRIPTION OF THE PREFERRED EMBODIMENTS

Figure 3:
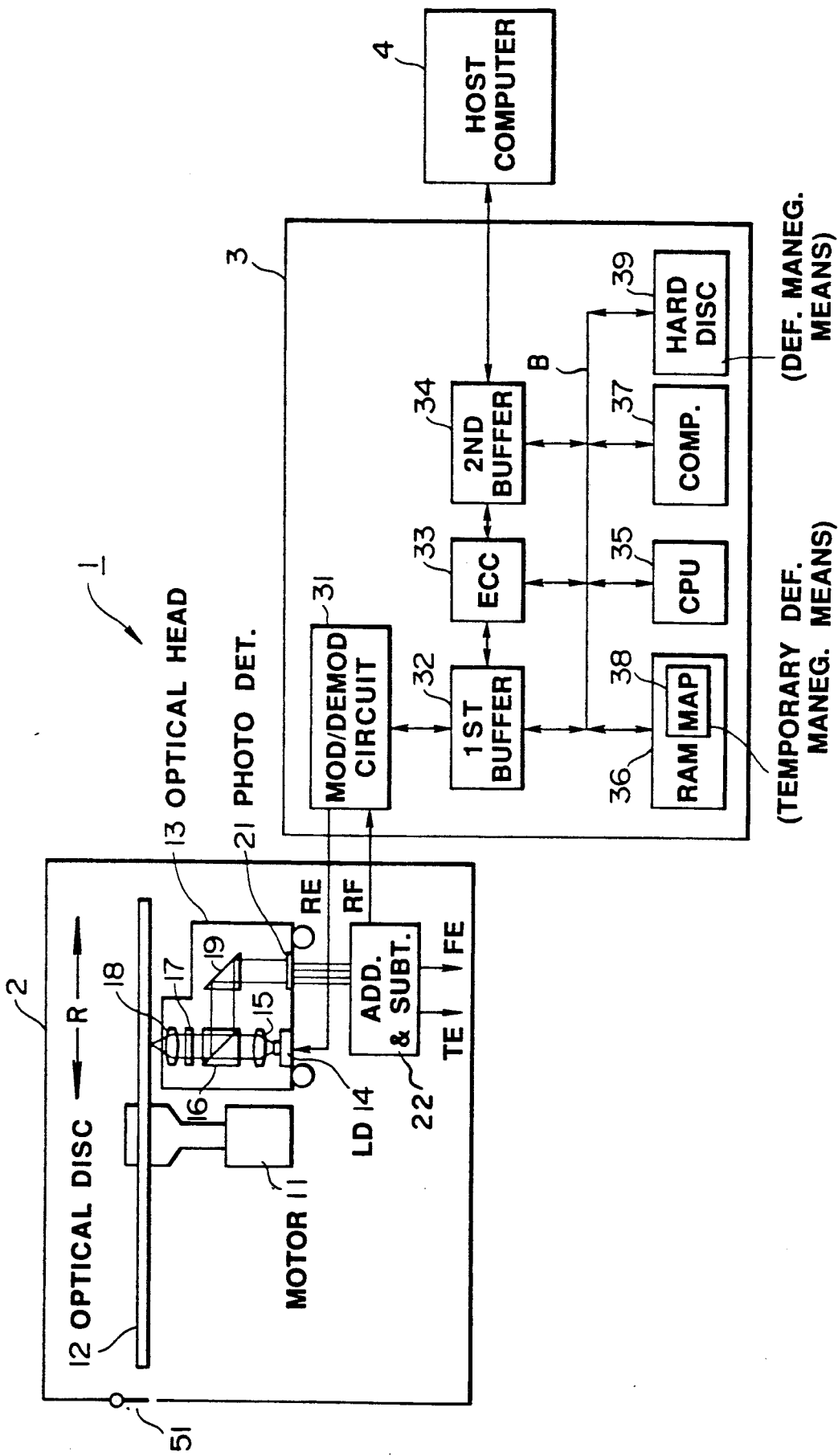

Referring to FIG. 3, an optical recording/reproducing apparatus 1 according to a first embodiment comprises an optical recording/reproducing unit (an optical disk drive unit) 2 and a disk control device 3. The disk control device 3 is connected to a host computer 4 so that data can be transferred.

The optical disk drive unit 2 has an optical head 13 at a position confronting one of the sides of the optical disk 12 which is rotated by a spindle motor 11. The optical head 13 can move in a radial direction R along the optical disk 12 by a head moving mechanism (omitted from the illustration) such as a voice coil motor so that the optical head 12 can access an optional track on the optical disk 12.

In the above-described optical head 13, laser beams emitted from a laser diode 14, which can generate coherent laser beams, are parallel to one another by passing through a collimator lens 15. Then, the parallel beams are incident upon a polarizing beam splitter 16 in the form of P-polarized light and thereby are substantially transmitted through the polarizing beam splitter 16 before they are transformed into circularly polarized light by a half-wave plate 17. The circularly polarized laser beams are converged by an objective lens 18 so as to be applied to the optical disk 12. The light reflected by the optical disk 12 becomes S-polarized light after it has passed through the half-wave plate 17. It is then substantially reflected by the polarizing beam splitter 16 so as to be incident upon a critical-angle prism 19 (actually the critical-angle prism 19 is positioned perpendicular to the drawing sheet when viewed in FIG. 3). The light reflected by the critical-angle prism 19 is received by, for example, a 4-sectioned optical detector 21 at which the light is photoelectrically transferred before it is supplied to addition/subtraction circuit 22. As a result, a reproduction signal RF and a focus error signal FE and a track error signal TE are generated.

The reproduction signal RF is supplied to a modulation/demodulation circuit 31 at which the reproduction signal RF is demodulated and is temporarily stored in a first buffer 32 having a storage capacity of, for example, a 1-sector capacity. The demodulated data (read data)

stored in the first buffer 32 is subjected to correction processing in accordance with an error correction code portion (ECC SEC) 33 before being stored in a second buffer 34 having capacity corresponding to, for example, one track. After the data corresponding to one track has been stored, it is transferred to the host computer 4;

In the recording mode, an error correction code for each sector is added to the data transferred from the host computer 4 and from the second buffer 34. Then, the data with the added error correction code is stored in the first buffer 32 before being modulated by the modulation/demodulation circuit 31 so as to be converted as a record signal RE into serial data (omitted from the illustration). The thus formed serial data is transferred to the optical disk drive unit 2 where it is recorded on the optical disk 12 by a quantity of light emitted from the laser diode 14.

The first buffer 32, the error correction code portion 33 and the second buffer 34 are connected to a CPU 35 via a bus B so that the operation of each of these components is controlled by the CPU 35. The CPU 35 is connected to a RAM 36 via the bus B, the RAM 36 being used as a working memory.

If a defective sector whose level exceeds the error correction capacity is detected from the reproduction signal RF read from the optical disk 2 by using the comparison function of the CPU 35 or a comparison circuit 37 under the control of the CPU 35, defective sector alternative processing such as writing the address of the defective sector in a map 38 serving as a temporary defect-control mean in the RAM 36 is performed.

In the recording mode in which data from the host computer 4 is recorded, data to be recorded is, in the error correction code portion 33, converted into record data to which the error correction code has been added before it becomes a record signal due to its passage through the modulation/demodulation circuit 31. The recording signal thus formed is recorded in a sector region of the specified address of the optical disk 12.

In order to examine whether or not the data has been correctly recorded on the optical disk 12 in this case, the data recorded on the optical disk is read out, and is subjected to error correction processing performed in the error correction code portion 33 so as to be made read data. The read data thus made is verified whether or not it coincides with the data to be recorded, the read data is verified by using the comparison circuit 37 or the like.

The above-described verification is performed in such a manner that the record data (which has not been subjected to error correction processing) for one sector and read data (which has been subjected to error correction processing) for one sector are stored in the RAM 36 so as to be determined whether or not the above-described two data coincide with each other by one to several bytes by using the comparison circuit 37 or the like. If it is determined that data for one sector coincides with each other, recording of data for the next sector is conducted.

If it is determined that the two data items do not coincide with each other, it is from determined that the subject data is a defective sector since the error thus arisen exceeds the error correction capacity. The address {for example, (0.1) shown in FIG. 7} of this sector is written in the map 38 by the CPU 35. In this map 38, the addresses of the alternative sectors have been written in a column at the second line in accordance with the sequential order of the generations of the alternative processings as shown in FIG. 4A, while the addresses of the detected defective sectors can be written in the column of the first line of the same. If there is no defective sector, the first line is filled with (0.0) or (FFH).

When writing is performed as shown in FIG. 4A, the alternative sector {in this case, it is the address (1.0)} corresponding to the address of the defective sector is accessed so that data to be recorded in the sector which has been determined to be a defective sector is recorded in this alternative sector. After the data has been recorded in this sector, the verification whether or not there is an error is again performed. If it is determined that there is no error, recording of data for one sector is performed.

If the two data items do not coincide with each other, it is determined that the alternative sector (1.0) (expressed with its address hereinafter) is a defective sector, causing defective sector (0.1) which is arranged to correspond to the alternative sector (1.0) shown in FIG. 4A to be erased. Thus, the map 38 is rewritten as shown in FIG. 4B, and the second alternative sector (1.1) is subjected to the similar processing performed for the first alternative sector (1.0). The above-described processing is continued until an alternative sector which is free from errors is finally detected. When the non-defective alternative sector is detected, a map, for example as shown in FIG. 4C, is formed.

Figure 5:
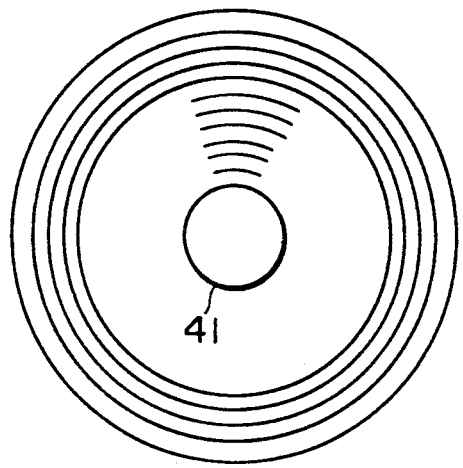

The alternative processing in the next data reproduction or recording is performed with reference to the thus formed map. Referring to FIG. 4C, since track address FF FF FFH is the address of the track which does not exist on the optical disk 12 in this case, the accessing operation to alternative sectors (1.0) to (1.2) corresponding to the address FF FFF FFH can be eliminated. That is, when data is read from a sector whose address is (0.1), its alternative sector (1.3) can be directly accessed so as to reproduce the data in this sector. Therefore, data reproduction time can be shortened. Before the data recording is completed and the operation with the apparatus 1 is stopped, the final contents of the map 38 is recorded (registered) with the identification code in the optical disk 12, for example, in a hard disk apparatus 39 serving as defect-control device. Alternatively, the final contents of the map 38 is, as shown in FIG. 5, registered in a defect-control area 41 which has been previously provided, for example, on the innermost track of the optical disk 12 which has been used in this operation. The contents written in the defect-control area 41 in each of the optical disks 12 may be arranged to be the same as those of the map 38 shown in FIG. 4C. The contents erased referring to FIG. 4C may be omitted and the recording may be performed as shown in FIG. 6A with the address of the defective sector of the alternative sectors omitted.

Figure 6A:
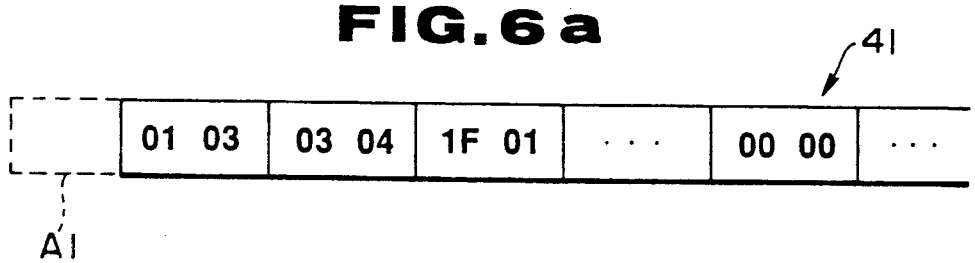
FIG. 6a-6c illustrates linkage information to be recorded (registered) in an optical disk or a hard disk.
Figure 6B:
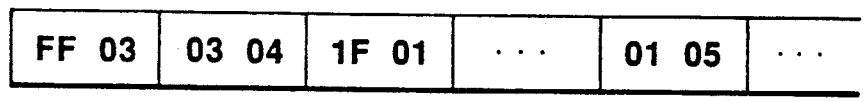

Referring to FIG. 6A, data 01 and 03 forming a pair, that is (01 03) represents the defective sector (0.1) and its alternative sector (0.3), while (00 00) represents a region in which data has not been written as yet.

In the case where the optical disk is an additional writing type, dara cannot be freely rewritten.

That is, data "0" corresponding to a state, in which there is no pit, can be reloaded to data "1". However, data "1" cannot be reloaded to data "0". Therefore, in the case where the state of the defect taken place in the optical disk 12 is as shown in FIG. 6A and the data in the alternative sector (03) cannot be reproduced due to the subsequent use, data 01 of (01 03) can be added to data FFH (in the case of 1 byte) all of which corresponds to a state in which there is a pit, and it can be changed so as to correspond to the non-defective sector (0.5). In this state, data FFH represents a value exceeding the number of the tracks of the optical disk. Therefore, the above-described correspondence establishment becomes meaningless.

Figure 6C:
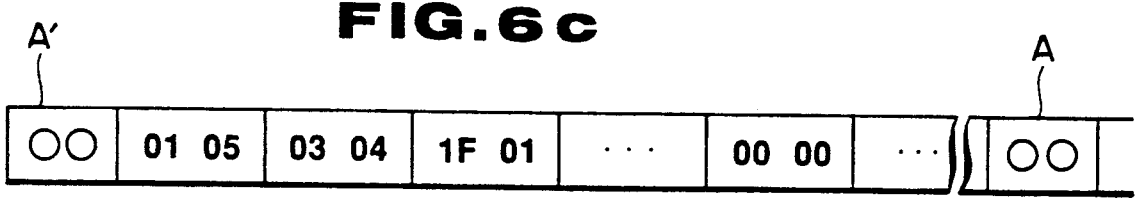

On the other hand, in the case of the hard disk device 39 which can be reloaded, the defective sector (0.3) can be reloaded to non-defective alternative sector (0.5) as shown in FIG. 6C. Referring to FIG. 6C, the identification codes corresponding to the optical disk 12 are recorded in, for example, a front portion A. The contents of the maps for the optical disks with the other identification codes are similarly recorded. Furthermore, as designated by short dashed lines of FIG. 6A, the identification code for the optical disk 12 is also recorded in the other portion, such as a control area 41 of each of the optical disks 12.

For the optical disk 12, the defective sector (0.3) can, sometimes, be changed to alternative sector (0.7) by the additional writing.

As shown in FIG. 3, the optical disk 12 can be replaced by inserting or ejecting from the unit 2 through an insertion port 51.

When the apparatus 1 is used, the control unit 3 identifies the identification code of the optical disk 12, forms the map shown in FIG. 4C by reading the data, which corresponds to the identification code and represents the correspondence between the defective sector and the alternative sector, from the hard disk device 39 or from the optical disk 12, and transfers it to the map 38 of the RAM 36. The recording or reproducing operation is performed with reference to the thus formed map.

The description has been made about the case in which a defect takes place in the data recording in the recording mode. However, a case can arise in which the address information (0.1 or the like) which had been previously written in the index portion in the front portion of the data recording portion of each of the sectors cannot be reproduced. In this case, the sector is determined to be defective. Then, the contents of alternative processing including the above-described case will be described.

Figure 1:
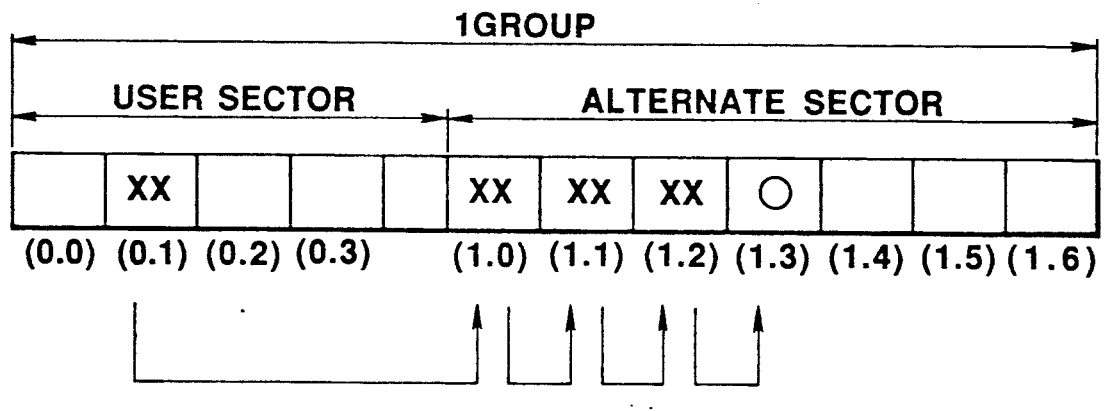
FIG. 1A illustrates a state of an operation performed in a conventional example, in which alternative processing is performed until a non-defective alternative sector is detected when it has been found that the target sector is defective.
FIG. 1B illustrates a map which shows the correspondence between the defective target sectors and the alternative sectors.
Figure 2:
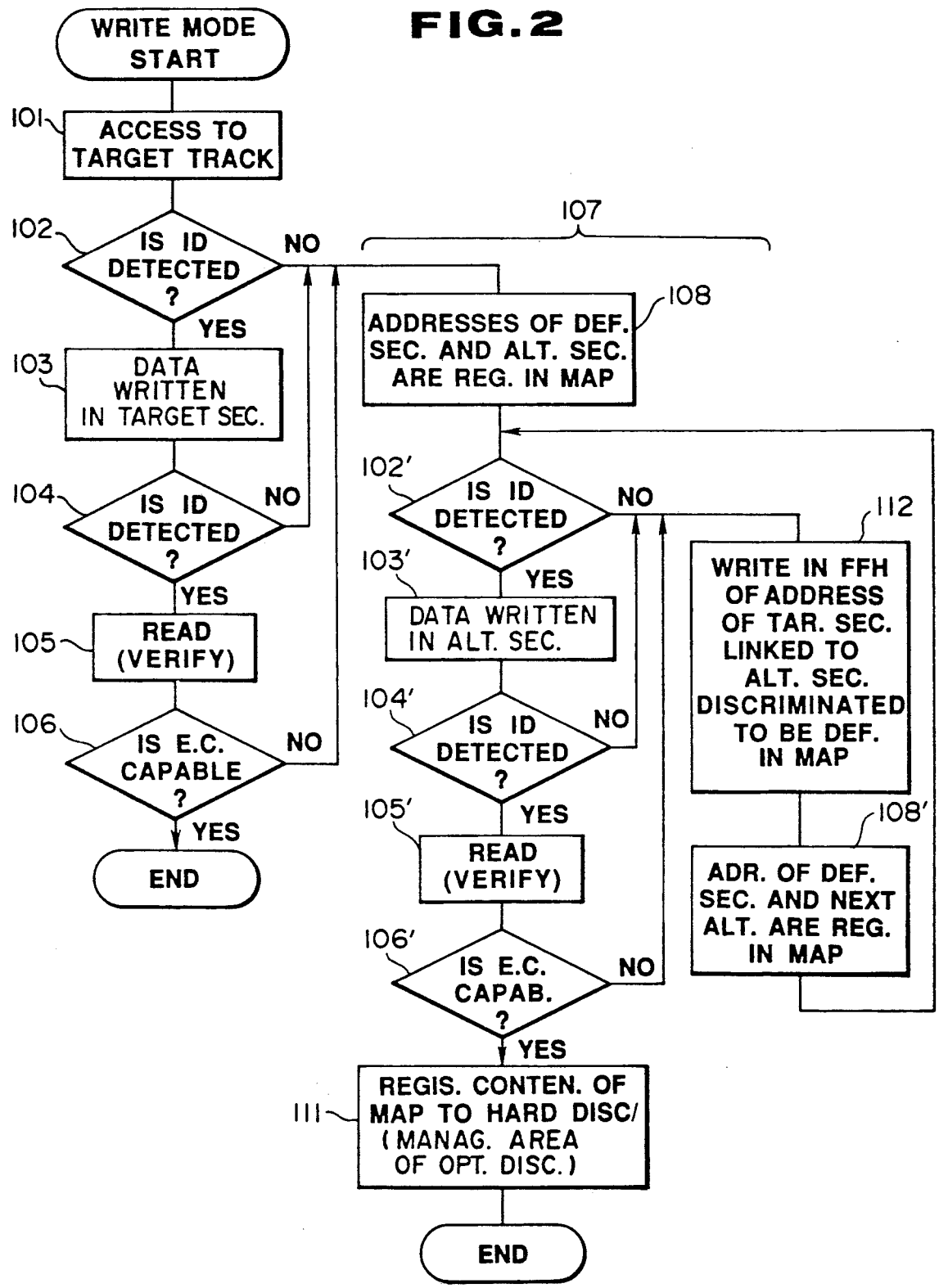

FIG. 2 illustrates a flow chart for use when data is recorded in which alternative processing is performed.

After the record mode has been started, the optical head 13 is moved for the purpose of recording data in a target sector. The optical head 13 accesses a target track to which the target sector belongs (process 101). Then, it is determined whether or not the index ID for the index portion of the target sector can be read (process 102). If the ID can be read (detected), data is recorded in the data recording portion positioned next to the index portion (process 103). In order to confirm that the data has been correctly recorded, a determination is made whether or not the ID can be read (process 104) after process 103. The data is read (process 105) so as to make a comparison between read data which has been subjected to the error correction code portion 33 and record data in the comparison circuit 37 in which whether the two data items coincide with each other is determined (process 106). If all data items coincide with one another, that is, if the errors are within the error correction capacity, it is determined that the record data has been correctly recorded in the target sector (in the strict sense of the word, the data has been correctly recorded within the error correction capacity). Thus, the data recording in this sector is completed.

If the ID cannot be detected in processes 102 and 104, or if the read data and the record data do not coincide with each other in process 106, the subject sector is determined to be a defective sector, and thereby alternative processing 107 is started.

In the alternative processing 107, the correspondence between the defective sector which must be subjected to the alternative processing and the alternative sector which is used instead of the defective sector is registered in the map 38 (process 108).

In this registration processing, the address of the defective sector (that is, the track No. to which this defective sector belongs and the sector No. of this defective sector) and the address of the alternative sector (a first alternative sector) are registered in the map 38. Then, the index portion of the alternative sector is accessed and a determination whether or not its ID can be detected is made (process 102'). If the ID could be detected, data to be recorded in the defective sector is recorded in the data recording portion of the alternative sector (process 103'). Then, process 104' to 106', which are similar to processes 104 to 106, are performed so as to confirm that the data has been correctly recorded in the alternative sector.

When data that has been correctly recorded in the alternative sector has been thus confirmed, the alternative processing on the map is ended, and the contents of the map are registered in the control area 41 of the optical disk or in the hard disk device 39 (process 111). Thus, the alternative processing is ended.

If it has been determined that the alternative sector is defective in processes 102', 104' and 106', the address (for example, FFH) which does not exist as a track on the optical disk is written in the address of the defective address which corresponds to the defective alternative address on the map (process 112).

Furthermore, the flow returns to process 102' after process 108', in which the next alternative sector (the second alternative sector) is registered instead of the defective sector, has been completed. In process 102', the second alternative sector is subjected to similar processing to which the first alternative sector has been subjected.

The alternative processing is continued until a non-defective alternative sector is found. Thus, if there is an alternative sector which cannot be used instead of the defective sector (if there is a defective alternative sector), the correspondence between the address of the defective sector and the address of the defective alternative sector is erased in process 112.

That is, finally, the ID and data of the defective sector can be made to correspond to only a non-defective alternative sector as a result of the alternative processing.

Therefore, when data to be recorded is read from a defective sector, defective alternative sectors, which have not been be subjected to the alternative processing cannot be accessed and the alternative sector which has been succeeded in the alternative processing can be directly accessed since the address of only the non-defective alternative sector is made to correspond to the address of the defective sector.

Then, a specific example will be described with reference to a flow chart shown in FIG. 2.

Figure 7:
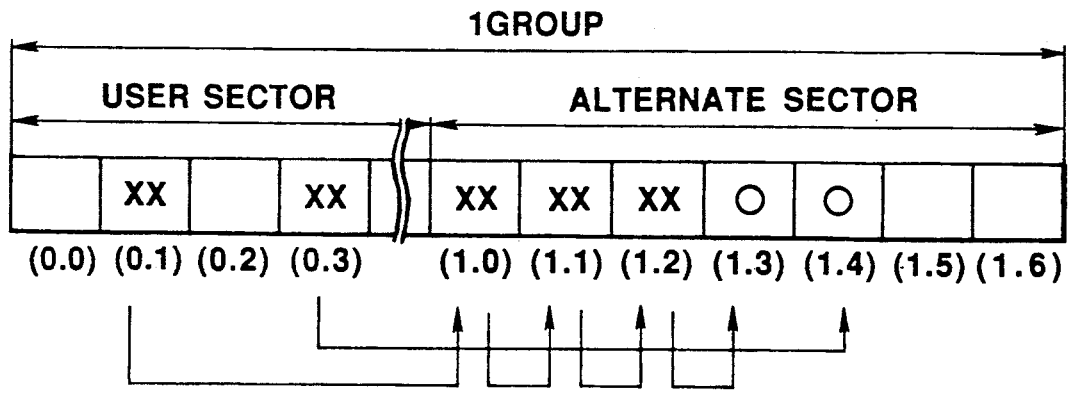

FIG. 7 illustrates a state in which: since sector (0.1), in which data has been recorded, was determined to be defective, alternative processing is conducted by using alternative sector (1.0).

If it is determined that the sector (0.1) is defective in processes 102, 104 and 106 shown in FIG. 2, the alternative sector (1.0) is selected instead of the defective sector (0.1). The correspondence between them is registered in the map 38 in process 108 so that the contents of the map 38 become as shown in FIG. 4A. If this alternative sector (1.0) is determined to be a defective sector in processes 102', 104' and 106', the contents are rewritten as shown in FIG. 4B in process 112.

That is, the address of a defective sector which has been made to correspond to the alternative sector which has been determined to be defective is rewritten to address FFFFFFH which does not exist on the optical disk 12. Thus, the linkage between the defective sector and the alternative sector which has been determined to be defective is erased.

As a result of this erasing operation and the process 108', the correspondence between the defective sector and the novel alternative sector is registered in the amp 38. Specifically, this registration is conducted as shown on the second line of FIG. 4B in which the two addresses (01, 11) form a pair.

In processes 102' to 106', the thus specified novel alternative sector is subjected to the determination of whether or not it is defective. The processes 102' to 106', 112 and 108' are repeated until a non-defective sector is detected.

When a non-defective alternative sector is detected, linkage information about the correspondence between the defective alternative sector, which has been the alternative sector until the non-defective alternative sector is detected, and the defective sector is erased. As a result, only linkage information about the correspondence between the non-defective alternative sector and the defective sector is allowed to remain. That is, as shown in FIG. 4C, the address of the defective sector which has been made to correspond to the address of the alternative sector which has been determined to be defective is replaced by the address which does not exist. Furthermore, the address (0.1) of the defective address is made to correspond to the address of a non-defective alternative sector.

Therefore, when data to be recorded in a defective sector, the address (1.3) corresponding to the address (0.1) of the defective sector is read from the map 38 shown in FIG. 4c, and data can be reproduced by accessing the alternative sector which corresponds to the address (1.3) of the defective alternative sector. That is, even if an alternative sector which has been failed in alternative processing is present when a defective sector is replaced by an alternative sector, the defective sector cannot be accessed by the optical head 13 when target data is reproduced because of the following reason: the linkages between the defective sector and all of the defective alternative sectors is cut, and the defective sector links to only a non-defective alternative sector. As a result, deterioration in the transfer rate when data in the optical disk 2 is transferred to the host computer 4 can be prevented.

When target information has been recorded and use of the apparatus 1 is stopped, the contents of the above-described map 38 is registered in the hard disk device 39 or the optical disk 12.

When the apparatus 1 is used again, defect control information of the optical disk 12 is read in accordance with the identification code of the loaded optical disk 12 and the map 38 is reproduced on the RAM 36. If a novel defective recording area is detected during the above-described operation, its linkage information is registered and the operations similar to the description made above is performed until a non-defective alternative area is detected. Thus, the use of the apparatus 1 is stopped immediately after the linkage information has been registered in the hard disk device 39 or the optical disk 12 (similarly to the above-made description, the linkage information between the defective alternative sector, which has been the alternative sector until the non-defective alternative sector is detected, and the target sector is erased).

In the case where the optical disk 12 is an additional writing type, the registration of the linkage information in the optical disk 12 is performed in such a manner that the contents of the map 38 are additionally written as shown in FIG. 4C and the linkage between the defective alternative sector and the target sector is substantially erased.

Figure 8:
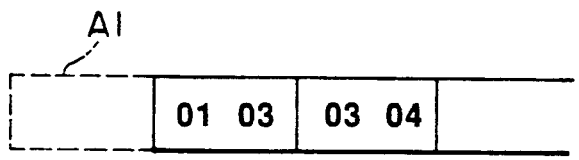
FIG. 8 illustrates a state in which linkage information about the correspondence of desired sectors and non-defective alternative sectors is recorded (registered)

In the case of a reloadable device such as the hard disk device 39, the contents shown in FIG. 4C may be registered intact or the linkage information between the defective alternative sector and the target sector may be erased and the address of the target sector and the address of the non-defective alternative sector may be linked to each other so as to be registered (change included) as shown in FIG. 8.

In the above description, the linkage information between the defective alternative sector and the defective target sector is erased by setting the address of the target sector to the track address which is outside of the adresses of the optical disk. Another structure may be employed in which a flag is provided on the address side of the target sector in addition to the address of the target sector which is to be linked to the address of the defective alternative sector so as to indicate that the linkage information has been erased.

Figure 9:
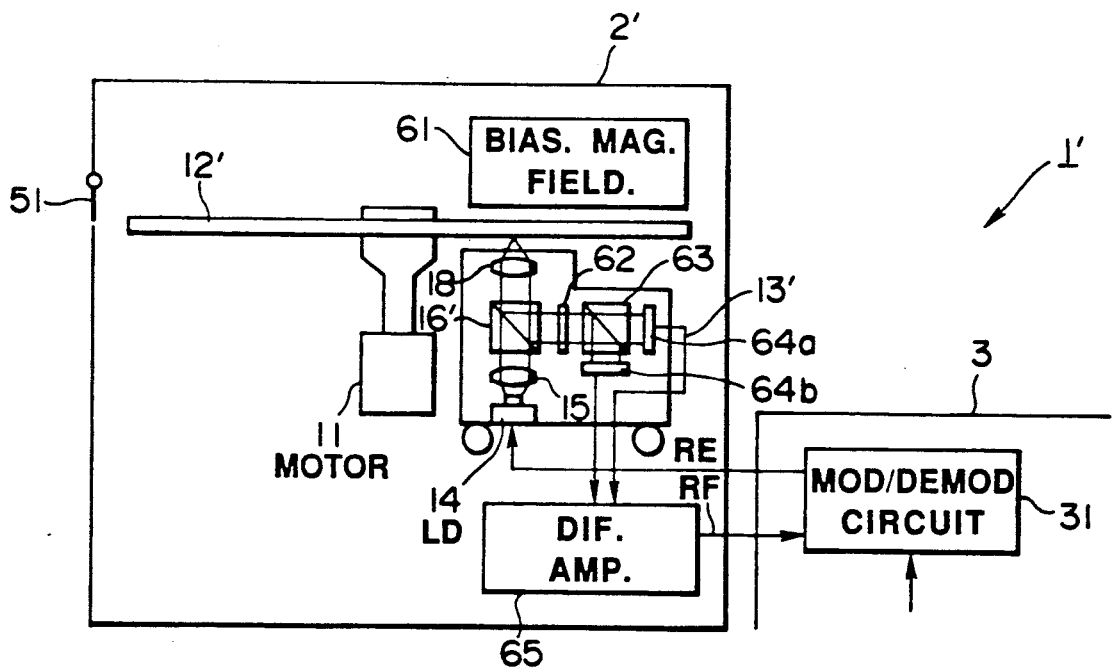
FIG. 9 is a structural view which illustrates an essential portion of a photo-electro-magnetic recording/reproducing apparatus according to a second embodiment of the present invention.

According to the first embodiment, an additionally writing type optical disk 12 has been employed, in the description. The present invention is not limited to this description. For example, the present invention can be applied to an optical recording/reproducing apparatus 1' with a reloadable recording medium such as a photo-magnetic disk 12' shown in FIG. 9.

The apparatus 1' comprises a photo-magnetic disk 12' employed as an alternative to the optical disk 12 of the apparatus 1 shown in FIG. 3. A photo-magnetic head 13' is positioned in such a manner that the photo-magnetic head 13' confronts either side of the photo-magnetic disk 12', and a bias magnetic field applying device 61 is positioned in such a manner that the bias magnetic field applying device 61 confronts the other side of the same. Thus, the photo-magnetic disk drive unit 2' is structured.

The photo-magnetic head 13' comprises a half prism 16' arranged to have the S-polarization reflectance of 100% and the P-polarization reflectance of 50% so as to replace the polarizing beam splitter 16 of the optical head 13 so that light which has passed through the half prism 16' is converged by the objective lens 18 without passing through the half-wave plate 17 and is applied to the photo-magnetic disk 12'.

Light returned from the photo-magnetic disk 12' passes through a half-wave plate 62 which rotates the polarizing direction by 45° before it passes through a polarizing beam prism 63. The light is then received by photo-detectors 64a and 64b so that a reproduction signal is obtained from a differential output from a differential amplifier 65 which receives the output from the photo-detectors 64a and 64b.

The other structure is similar to that according to the first embodiment.

In the case where the apparatus 1' according to the second embodiment is used, the linkage information of the photo-magnetic disk 12' can be registered (recorded) in the photo-magnetic disk 12' similarly to the operation for the hard disk device.

Although the description has been about an optical disk apparatus which has been sectioned into a plurality of sectors, the present invention may be applied to a medium which has not been sectioned or to an erasable medium such as a photo-magnetic medium. Furthermore, the present invention may be applied to a medium in the form of a card as an alternative to the disc shape. In addition, the structure arranged in such a manner that the address No. which does not exist on the disk is written may be replaced by a structure arranged in such a manner that a flag is provided for a defective sector.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An alternative section selector for an optical recording/reproducing apparatus, said optical recording/reproducing apparatus records data output by an external device on a plurality of sections of an optical recording medium, said alternative section selector comprising:

a comparison means for comprising said data, prior to being recording on one of said sections of said optical recording medium, with identical data after being recorded on said one section of the optical recording medium, said comparison means for determining a result of comparison indicating whether said data after being recorded coincides with said data prior to recording, said comparison means for outputting a defective section signal indicating said section is a defective section based on said result;

an alternative section selector means, connected to said comparison means, for selecting an alternative section of said defective section signal is output by said comparison means; and linking means for storing linkage information which links defective sections of said optical recording medium and alternative sections which are determined to be non-defective by said comparison means, wherein said comparison means comparing said data, before and after recording, for each alternative section selected by said alternative section means wherein defective alternative sections are determined.

2. An apparatus according to claim 1, wherein said optical recording medium is replaceable.

3. An apparatus according to claim 1 or 2, wherein said linkage means is a CPU, said linkage information which links defective sections of the optical recording medium and defective alternative sections is erased by changing an address of said defective section to an address value which is not assigned to said optical recording medium.

4. An apparatus according to claim 3, wherein said linkage means further acts to cause the address of said alternative section which has been determined to be non-defective and the address of said defective section to be stored-recorded in said linkage means as linkage information between said alternative section which has been determined to be non-defective and said defective section.

5. An apparatus according to claim 1 or 2, wherein said linkage means comprises semiconductor memory device for reloading said linkage information whenever said apparatus is used.

6. An apparatus according to claim 1, or 2, wherein said linkage means comprises reloadable recording device for reloading said linkage information whenever said apparatus is used.

7. An apparatus according to claim 6, wherein said reloadable recording device is a hard disk device.

8. An apparatus according to claim 6, wherein said reloadable recording device is formed by a recording area which is a portion of said optical recording medium in the case where said optical recording medium is reloadable.

9. An apparatus according to claim 1 or 2, wherein said linkage means comprises an additional writing type recording device in the case where said optical recording medium is an additional writing type.

10. An apparatus according to claim 9, wherein said additional writing type recording device is formed by a recording area which is a portion of said optical recording medium.

11. An apparatus according to claim 2, wherein said linkage means comprises non-volatile storage/recording device for retaining said linkage information even if power for said apparatus is turned off, and a semiconductor memory for reading said linkage information which corresponds to said loaded optical recording medium from said non-volatile storage/recording device whenever said apparatus is used and forming a map, said linkage means writing said linkage information in said map when said linkage information has been changed during the operation of said apparatus, and registering said linkage information of said map in said non-volatile storage/recording device immediately before the operation with said apparatus is stopped.

12. An apparatus according to claim 11, wherein said non-volatile storage/recording device is formed by a recording area which is a portion of said optical recording medium.

13. An apparatus according to claim 11, wherein said non-volatile storage/recording means stores/records a plurality of said linkage information of said optical recording medium to be used.

14. An apparatus according to claim 11, wherein said non-volatile storage/recording means is formed by a hard disk device.

15. A method for selecting non-defective sections of an optical recording medium, said optical recording medium recording data output by an external device, said method comprising the steps of:

comparing said data, prior to being recording on said section of the optical recording medium, with identical data after being recorded on and reproduced from the section of the optical recording medium and determining coincidence therebetween which indicates whether said section is defective;

selecting an alternative section of said optical recording medium for recording said data when coincidence between compared data is not within a predetermined range indicating said section is defective;

linking a defective section with said alternative section which is selected;

repeating the first and second steps to determine if the alternative section is defective; and repeating the fourth step if the alternative section is determined to be defective until a newly section alternative section is determined to be non-defective wherein linking information between defective sections and non-defective alternative sections are retained and all linking information between the defective sections and defective alternative sections are not retained.

16. A method according to claim 15, wherein said linkage information is information obtained by storing/recording the address of said defective section and the address of the corresponding alternative section.

17. A method according to claim 16, wherein said linkage information about the correspondence between said defective alternative section and said defective section is substantially erased by changing the address of said defective section to the address which does not exist in said optical recording medium, said address of said defective section corresponding to the addresses of all of said alternative sections which have been determined to be defective before said non-defective alternative section is obtained.

* * * * *